United States Patent [19]

Snyder et al.

[11] Patent Number: 4,771,171
[45] Date of Patent: Sep. 13, 1988

[54] ISOTOPE ANALYSIS DEVICE AND METHOD

[75] Inventors: James J. Snyder, Clarksburg, Md.; Thomas B. Lucatorto, Washington, D.C.; Philip H. Debenham, Derwood, Md.

[73] Assignee: Atom Sciences Corporation, Oakridge, Tenn.

[21] Appl. No.: 780,820

[22] Filed: Sep. 27, 1985

[51] Int. Cl.4 .................... H01J 49/26; H05H 13/02; B01D 59/44
[52] U.S. Cl. .................................. 250/281; 250/282; 250/283; 250/284; 250/298; 55/2; 55/3; 313/62; 328/234
[58] Field of Search .............. 250/281, 282, 283, 284, 250/294, 298, 423 R, 423 P; 55/2, 3; 313/62; 328/234

[56] References Cited

U.S. PATENT DOCUMENTS 4,200,844 4/1980 Nunan ................................ 328/234

OTHER PUBLICATIONS

Smith et al., Review of Scientific Instruments, vol. 27, No. 8, Aug. 1956, pp. 638–649.

Primary Examiner—Bruce C. Anderson
Assistant Examiner—Jack I. Berman
Attorney, Agent, or Firm—Gerald J. Ferguson, Jr.

[57] ABSTRACT

Isotope analysis device comprising a racetrack-shaped ion storage ring, a resonant charge exchange device and a laser photoionization device. Isotope ions to be analyzed are continuously injected into the racetrack in a first orbit and pass through the resonant charge exchange device where they are neutralized and decelerated to produce decelerated isotope particles. Selected isotope particles are then re-ionized by the laser photoionization device, and the resulting selected isotope ions travel around the racetrack in a smaller orbit, while the undesired non-ionized particles exit the storage ring and are separately collected. After several succesively decreasing ion orbits, each isotope of the desired species reaches a detector where it is measured. The device is particularly useful for isotope analysis of strontium and of krypton.

29 Claims, 4 Drawing Sheets

ISOTOPE ANALYSIS DEVICE AND METHOD

The present invention relates to ultra-sensitive isotope analysis, and in particular to a device and method combining magnetic mass selection, resonant charge exchange and laser photo ionization to achieve isotopic abundance sensitivities which are several orders of magnitude better than is currently possible utilizing conventional mass spectrometers.

The United States government has a non-exclusive irrevocable royalty-free license in the invention of the present patent.

BACKGROUND OF THE INVENTION

New techniques of mass spectrometry employing tandem accelerators or cyclotrons at MeV energies have attained isotope abundance sensitivities near $10^{-16}$, many orders of magnitude better than the present $10^{-10}$ limits of conventional keV instruments. This improved capability, characterized by the term "ultra-sensitive mass spectrometry", has been applied to measurements of certain rare isotopes which are useful as chronometers and tracers. The list includes $^{10}$Be, $^{14}$C, $^{26}$AL, $^{36}$Cl and $^{129}$I.

The measurement of rare isotopes by ultra-sensitive mass spectrometry has several important advantages over techniques based on radioactive decay. The most significant of these is the gain in sensitivity, especially with the long-lived nuclides. For example, in the case of $^{14}$C a mass spectrometer with a detection efficiency of $10^{-3}$ would record $5 \times 10^4$ $^{14}$C atoms per milligram of contemporary carbon from a biological source at a rate of one atom per second or more. In contrast the one mg of carbon (which is relatively short-lived amongst nuclides used as chronometers) would take eight years to generate $5 \times 10^4$ beta decays. Other advantages are that mass spectrometry can, in addition, measure rare non-radioactive isotopes (as in the case of Ir and Pt), and that the ratios between abundant and rare isotopes are more readily obtained.

High energy mass spectrometry has demonstrated impressive capabilities for some of the lighter elements; abundances of $10^{-14}$ for $^{10}$Be, of $3 \times 10^{-16}$ for $^{14}$C and $2 \times 10^{-16}$ for $^{36}$Cl have been detected. However, because of isobaric and molecular interferences which become more difficult to eliminate for higher atomic number Z, high energy mass spectrometry cannot achieve comparable abundance sensitivites for the heavier elements. For example, the abundance sensitivity in the $^{129}$I measurements is limited to $10^{-11}$ due to isobaric interference by $^{129}$Xe. Another disadvantage of this technique is related to the difficulty in maintaining source and transmission stability, a problem which has thus far limited the accuracy of measurement. Also, in the case of the tandem accelerator, the technique can only be applied to atoms which form bound negative ions.

Recently there have been several proposals to employ laser techniques to achieve abundance sensitivities comparable to the ultra-sensitive high-energy mass spectrometer. Kudriavtsev et al, Applied Physics B 29,219 (1982), have proposed using collinear laser resonant multi-photon ionization of accelerated atoms. They describe two advantages to be gained by irradiating a several keV atomic beam along the direction of motion, namely:

1. The mass dependent velocity difference between two isotopes accelerated to the same energy produces a mass dependent Doppler shift which can improve the selectivity.
2. The velocity bunching that occurs during acceleration of the ions decreases the Doppler broadening which otherwise degrades the selectivity. For the case of $^{26}$Al vs. $^{27}$Al accelerated to 10 keV a selectivity of about $10^{-14}$ is calculated for the laser ionization process.

A second scheme proposes using Doppler-free resonance ionization as an ion source for a conventional mass spectrometer. This technique provides two or three stages of selection: one or two stages of laser ionization which can produce isotopic enhancements of greater than 1000 per stage in most cases, followed by mass analysis for an overall isotopic abundance sensitivity which could be as high as $10^{-13}$.

The laser-based schemes just described use selective laser ionization of the isotope of interest. Keller, et al Laser Focus 17, No. 10, 75(1981) have proposed the fluorescence detection of mass selected ions as they exit from a conventional mass spectrometer in order to discriminate against isobaric interference and enhance the overall abundance sensitivity. The projected selectivity for ions having resonance lines accessible to presently available lasers is greater than $10^{-15}$.

OBJECTS OF THE INVENTION

It is, accordingly, an object of the present invention to provide a laser-based technique capable of abundance ratio measurements with sensitivities approaching $10^{-15}$.

Another object of the present invention is to provide a laser technique which employs laser photo ionization, but which cycles a beam of sample ions several times through the ionization region located along one arm of an ion beam storage ring, so that during each orbit of the ring, un-ionized isotopes and contaminants are removed from the ion beam until after several orbits the desired degree of enrichment is attained

SUMMARY OF THE INVENTION

According to one embodiment of the invention, there is provided a particle handling device comprising a particle speedchanging and neutralizing means for changing the speed of charged particle traveling along a first path toproduce speed changed neutral particles and an ionizing means connected to the speed changing means for ionizing selected speed changed particles to produce selected speed-changed charged particles. The device preferably also has a cycling means connected to the ionizing means for cycling the selected charged particles along a second path which is separated from the first path.

The device of the invention according to another embodiment may be utilized for analyzing isotopes, and preferably includes an ion source means for producing and accelerating isotope ions, a cycling means for confining and cycling the isotope ions, a transporting means for transporting the isotope ions from the ion source means into the cycling means and means for focusing and steering the isotope ions within the cycling means. The device also includes a speed changing means for changing the speed of the isotope ions in the cycling means, a neutralizing means for neutralizing the isotope ions after the speed of the isotope ions has been changed by the speed changing means, and ionizing means for ionizing selected neutralized isotope particles after they emerge from the neutralizing means, a means for separating the resulting selected isotope ions into different orbits according to their mass and their speed, the cycling means then cycling the selected isotope ions through the speed changing means, neutralizing means and ionizing means as many times as is desired, and a means for detecting and/or collecting the selected isotope ions after a predetermined number of orbits through the speed changing means, the neutralizing means and the ionizing means.

According to another embodiment of the invention, there is provided an isotope analysis device comprising speed changing and neutralizing means for speed changing and neutralizing selected isotope ions traveling along a first path to produce speed changed isotope particles. The device also includes an ionizing means connected to the speed changing means for ionizing selected speed changed isotope particles to produce selected isotope ions. A cycling means is connected to the ionizing means for cycling the selected isotope ions along a second path which is separated from the first path, so that un-ionized isotopes and contaminants are removed and the selected isotope ions are enriched.

According to a further embodiment of the invention, there is provided a method for handling particles, comprising the steps of changing the speed of charged particles traveling along a first path and neutralizing said particles to produce speed changed neutral particles, and ionizing speed changed particles to produce speed changed charged particles. The speed changed charged particles are then cycled along a second path which is separated from the first path.

According to a yet further embodiment of the invention, there is provided a method for analyzing isotopes, comprising the steps of speed changing and neutralizing selected isotope ions traveling along a first path at a speed changing and neutralizing station to produce selected speed changed neutral isotope particles. Selected speed changed particles are then ionized at an ionizing station to produce selected isotope ions, and the selected isotope ions are then cycled along a second path which is separated from the first path so that unionized isotopes and contaminants are removed and the selected isotope ions are enriched.

The speed changing and neutralizing means preferably comprises a biased resonant charge exchange neutralization device, and the ionizing means preferably includes a resonant laser ionizing device. The transport cycling means is preferably a racetrack-shaped ion storage ring having, at each end, a 180 degree bending magnet. From this, it will be appreciated that the present development combines magnetic mass selection, resonant charge exchange neutralization and resonant laser ionization, which enables the attainment of very high isotopic abundance selectivity by means of continuous multi-stage separation of ions stored in the storage ring. The development is particularly applicable for analyzing strontium(Sr) and krypton(Kr), and especially the environmentally interesting case of $^{90}$Sr versus $^{88}$Sr which is relevant to monitoring of environmental contamination caused by nuclear reactors and nuclear weapons tests. The rare isotope $^{90}$Sr is an element which is too heavy for ultra-sensitive measurement by the high-energy mass spectrometry techniques described above. In this case, it is believed that a sensitivity near $10^{-15}$ for a throughput of $10^{13}$ atoms per second and an efficiency(after the ion source) of greater than 10% may be achievable. Like previously discussed laser techniques, the technique of the present development employs resonant laser photo-ionization in order to reduce the problems of isobaric and molecular interferences which place ultimate limits of high energy and conventional mass spectrometry. However, unlike the previously discussed techniques, the present development cycles a beam of sample ions several times through an ionization region, for example a sub-Doppler multi-photon ionization region, located along one arm of the storage ring. During each orbit of the ring, unionized isotopes and contaminants are removed from the ion beam until after several orbits the desired degree of enrichment is attained.

BRIEF DESCRIPTION OF THE DRAWINGS

Preferred embodiments of the present invention will now be described with reference to the following drawings, in which.

DETAILED DESCRIPTION OF THE INVENTION

In the following description, reference is made to the device of the invention as an isotope analysis device for analyzing isotopes. However, the present device can be used for handling any type of particle which is ionizable to produce a charged particle or which is inherently charged. Examples of particles which may be used in the present device are molecular ions, isotopes, and other elementary particles (other than atoms) such as positrons and anti-protons. Thus, the following description referring to the device as an isotope analysis device is not to be construed as meaning that the device can only be used for analyzing isotopes.

In addition, in the following description, reference is occasionally made to deceleration of particles with the resultant switching of the particles to the next smaller orbit in the ion storage ring. It will be appreciated, however, that it is also possible to accelerate the particles in order to achieve the desired orbit separation, and this will result in the particles being switched to the next larger orbit in the ion storage ring.

Figure 1:
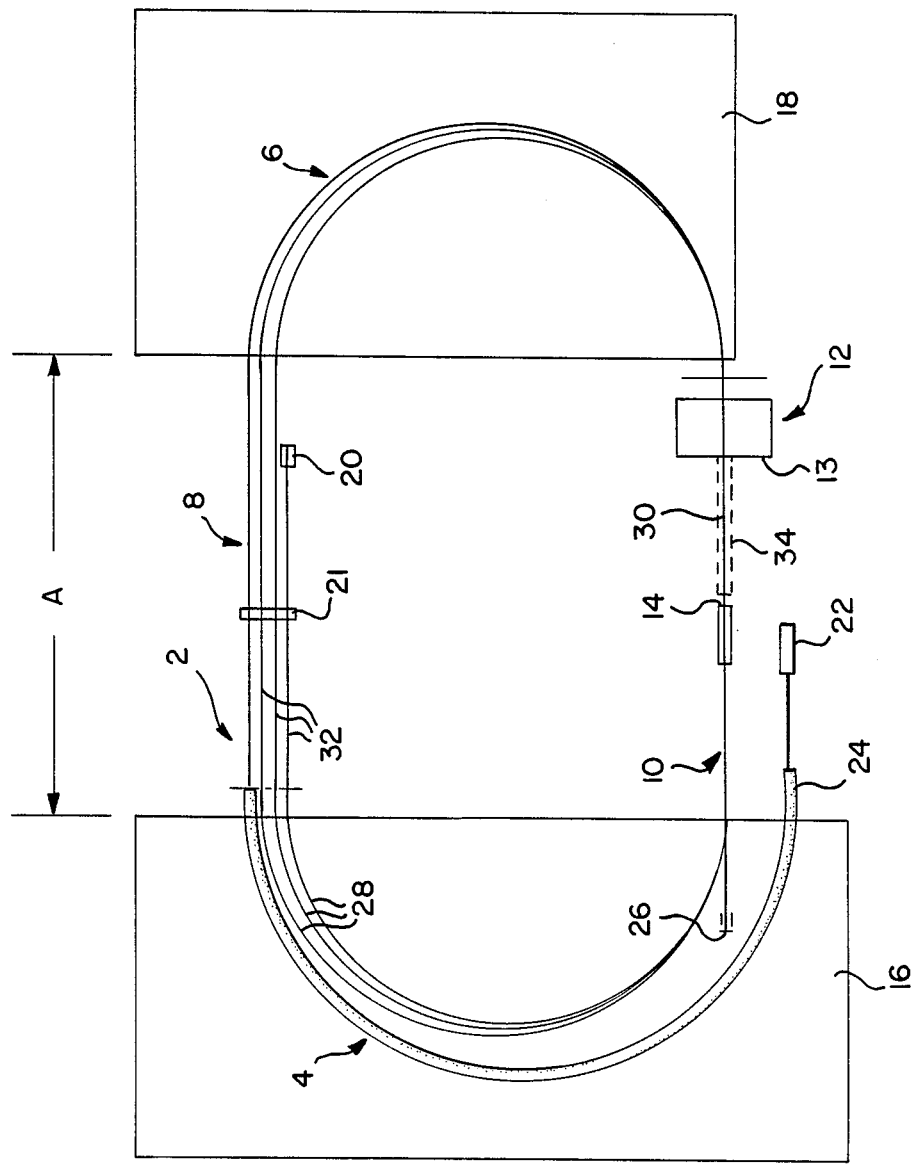
FIG. 1 is a schematic view of a racetrack storage ring of the present invention.
Figure 2:
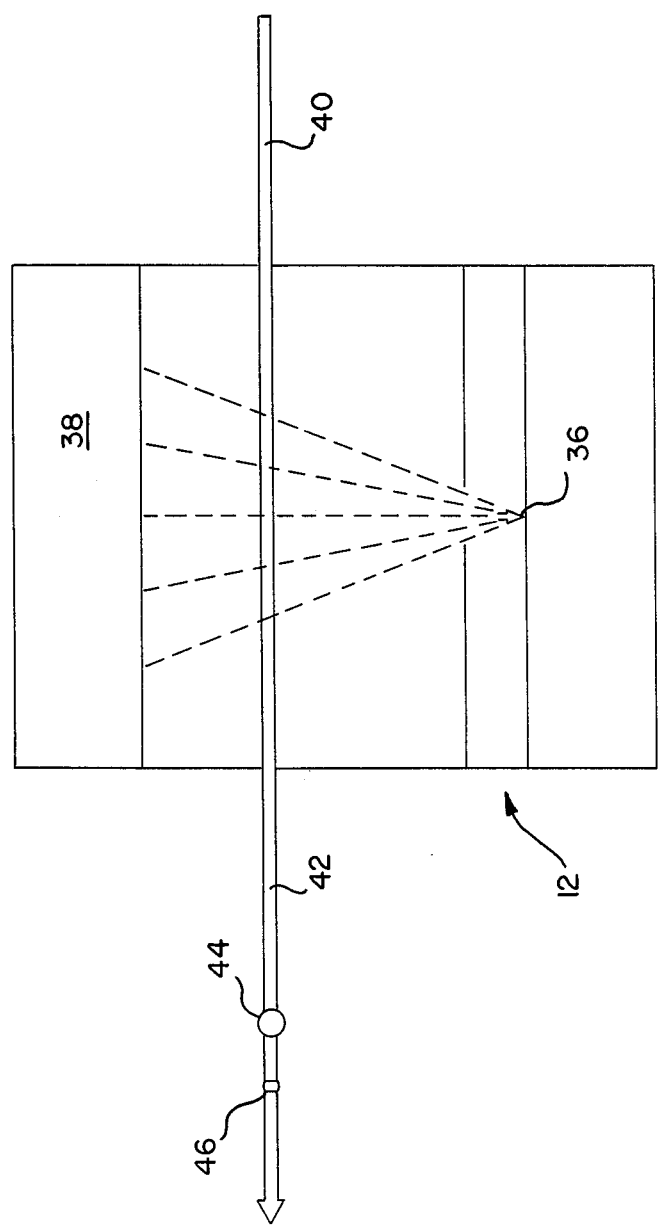
FIG. 2 is a schematic diagram of a charge exchange cell and a laser ionization region utilized in the present invention.
Figure 3:
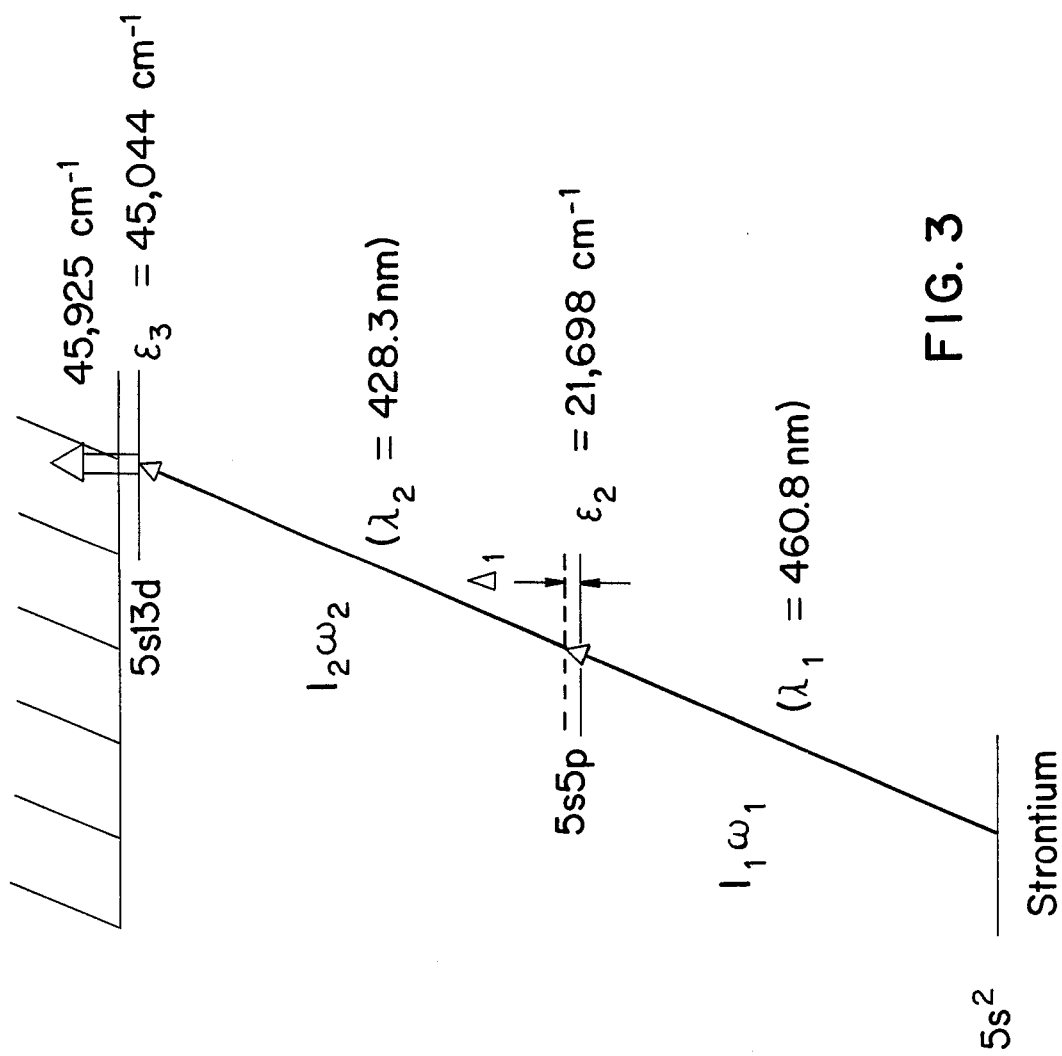
FIG. 3 is a partial energy diagram for strontium showing a two-photon transition to the 5s 13d Rydberg state and the subsequent photo ionization step.

Referring, now, to FIG. 1, there is illustrated a small racetrack-shaped ion storage ring, generally refenenced 2, having semi-circular path end sections 4, 6 and linear path side sections 8, 10. A speed changing means 12 is provided in one of the linear side sections, and an ionizing device 14 is provided adjacent to the speed changing means 12 for ionizing the isotope of interest. The speed changing means 12 may be a charge exchange cell 13 or alternatively, may be a heat pipe 34 (shown in dotted lines). A magnetic field generating device 16, 18 is associated with the respective end sections 4, 6 and the magnetic field generating devices may be permanent magnets or, preferably, electro magnets. An ion detector 20 is located in the side section 8 for detecting isotope ions of interest after they have travelled along several orbits around the ion storage ring 2. Isotopes to be analyzed are provided by an ion source 22, and the isotope ions are introduced into the ion storage ring 2 along a shielded beam transport tube 24. A beam dump 26 is provided in axial alignment with the ionizing device 14 for collecting non-ionized isotope particles emerging from the ionizing device 14.

It is estimated the ion storage ring 2 may provide an isotopic selectivity of $10^{-3}$ to $10^{-4}$ per orbit for adjacent isotopes at an atomic mass(A) of about 100. The configuration of the racetrack ion storage ring 2 leads to discrete, tangential orbits 28 for different ion energies. Each orbit 28, as shown in FIG. 1, has a common path 30 for the linear section 10 through the charge exchange cell 12 and ionizing device 14. However, the return paths 32 of each orbit 28 are physically separated by a distance approximately proportional to the kinetic energy differences of the isotope ions. Thus, as each isotope ion is neutralized upon passage through the charge exchange cell, it is switched to the next smaller orbit as a result of its attendant deceleration upon entering the ionizing device. The desired degree of enrichment is chosen by positioning the ion detector 20 to intercept the appropriate orbit.

As mentioned earlier, the charge exchange cell 13, which is a biased charge exchange cell, neutralizes the ion beam prior to ionization. The charge exchange cell also incrementally decelerates the ions during each cycle of enrichment in order to cause each of the desired isotope ions to follow a decaying spiral path until it reaches the ion detector 20. In order to reduce back contamination of the highly purified isotope ions in the ring, successive ion orbits follow different trajectories, and orbit separation is accomplished by decelerating the ion beam as it enters the voltage potential of the charge exchange cell 13. Part of the resulting neutral beam is re-ionized by laser photo ionization after it leaves the charge exchange cell, but before it enters the magnetic field generated by device 16. Ions which are neutralized within the charge exchange cell 13 and photo ionized outside the cell 13 will not be re-accelerated, and will therefore follow a new orbit with a smaller diameter than before, typically about 1 cm smaller than before. During each orbit, the ions are mass-separated by the two devices 16, 18, typically two 180° bending electro magnets having a magnetic strength of 2.5 to 5 kG. The distance A can be any appropriate distance, and is typically 40 cm to 100 cm.

It will be understood that the speed changing of the isotope ions (acceleration or deceleration) occurs as a result of the isotope ions, at a specific potential, for example ground potential, entering a region of different potential, i.e. the voltage potential inside the charge exchange cell 13. While the isotope ion is subject to that different potential, it is neutralized, and the neutralized particle then re-enters the region of its original potential (typically ground potential). However, the particle does not again change speed since it is neutralized. The neutralized particle is then ionized and transported around the ion storage ring 2 in an orbit separated from its immediately preceding orbit.

Referring to the ionization stage, ionization is preferably achieved utilizing laser ionization. It is also possible to utilize microwave ionization as well as microwave ionization in combination with laser ionization, but laser ionization on its own is the preferred ionization technique. Referring to laser ionization, the laser radiation is tuned in exact resonance with one or more energy levels of a selected isotope of a given element. The laser radiation may be tuned to be in exact single or multiple photon resonance depending on the energy levels of the selected isotope, and this will reduce the isobaric and molecular interferences which affect mass-only separators. The photoionization is performed following the deceleration/neutralization stage, and also those atoms which are photo ionized will remain in the ion storage ring 2. Atoms not ionized continue straight through the magnetic field into the beam dump 26.

With reference to the charge exchange cell 13, if the charge exchange gas is the same species as that being analyzed, or otherwise has a large resonant charge exchange cross-section then there is essentially complete neutralization of the ion beam within a few centimeters at modest pressure, typically 1/10 to 1/20 Torr. Other species, such as isobaric contaminates, generally have much smaller non-resonant cross-section for charge exchange. Thus, only the correct species is likely to be decelerated out of the initial orbit and into the next lower orbit. Contaminant ions which remain un-neutralized in the initial orbit are removed by collision with the beam injection apparatus comprising the ion source 22 and the shielded beam transport tube 24.

The successive deceleration of the isotope ions following each stage of enrichment leads to discrete physically separated orbits. This orbit separation offers very high rejection of adjacent isotopes as well as reducing re-contamination of the enriched species by low angle scattering from background gas or by resonant charge exchange with unenriched fast neutrals in the first orbit. The reason for this is that the successive deceleration and resulting orbit separation have very low probability of leaving undesired ions in the orbit intercepted by the ion detector 20. In addition, the resonant charge exchange and the photo ionization processes virtually eliminate isobaric and molecular interferences.

The net enrichment of each orbit 28 in the ring 2 will depend both on the isotope shift and line width of the resonant ionization process, and on the mass selectivity of the magnetic field generating devices 16, 18. For many interesting isotopes, the ionization enrichment per orbit will approach 1000 and the mass enrichment at least 1000 per orbit so that, for example, 3 orbits could give a theoretical enrichment of $10^{18}$.

The efficiency of the enrichment process n orbits after injection will be the nth power of the single orbit efficiency, which should depend primarily on the single or multiple photon excitation and the photoionization efficiency. For many isotopes, the single isotope efficiency should be near 50% so that a 3-orbit efficiency approaching 10% should be achievable. Higher efficiencies are possible through the use of multiple regions of resonant ionization, but at the expense of selectivity. Higher efficiecies can also be achieved by collecting and re-processing particles which have been lost from the ion storage ring, as well as sample gas which has leaked from the ion source.

The efficiency is also degraded by ion beam neutralization due to charge exchange collision with background gas. For the device illustrated in FIG. 1, the total distance of each orbit is about 2 meters, or less than 10 meters total travel for the ion beam from source to collector. If it is assumed that a background gas pressure of $10^{-4}$ Pa and a resonant charge exchange cross-section of $10^{-14}$ cm$^2$ (which would be appropriate for the worst case of a background gas primarily of the same species of the ion beam), then 30% of the beam would be lost to charge exchange collision in a ten meter path.

A novel technique for ultrasensitive isotopic analysis is thus described which combines magnetic mass selection, resonant charge exchange neutralization and resonant laser ionization in a racetrack shaped ion storage ring. The primary advantages of this approach are the high selectivity and efficiency as well as the excellent immunity to isobaric and molecular interference, to low-angle background gas scattering and to accidental charge exchange processes.

Figure 4:
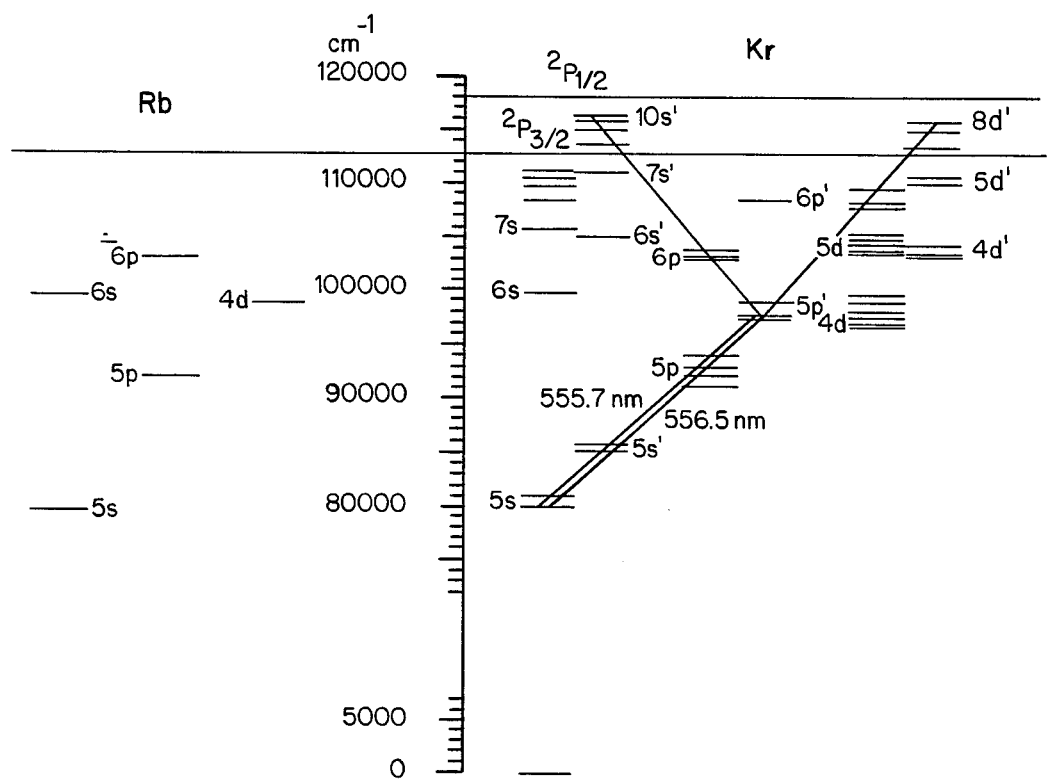
FIG. 4 shows partial energy diagrams for krypton and rubidium, drawn relative to a common ionization potential and showing two possible photo ionizing transitions.

Referring to FIG. 4, this illustrates partial energy diagrams for krypton (Kr) and rubidium(Rb) which are relevant when the device is to be used for the analysis of krypton using a charge exchange device in which the charge exchange gas is rubidium. Rubidium has a large resonant cross-section for transfer of an electron into the metastable first excited state of krypton and, because of the internal energy of the metastable krypton beam emerging from the charge exchange heat pipe, the beam can be easily photoionized by two visible photons via a resonant intermediate p state to an ns or nd photoionizing level. Two possible photoionizing transitions are shown in FIG. 4.

We claim:

1. A particle handling device, comprising:
    a particle speed changing means for changing the speed of charged particles traveling along a first path to produce speed changed charged particles;
    neutralizing means connected to said speed changing means for neutralizing the speed changed charged particles to produce speed changed neutral particles;
    ionizing means connected to said neutralizing means for ionizing speed changed neutral particles to produce speed changed charged particles;
    cycling means connected to said ionizing means for cycling said charged particles along a second path which is separated from said first path.

2. A device according to claim 1, wherein said neutralizing means is a charge exchange means for neutralizing said particles to produce said speed changed neutral particles.

3. A device according to claim 2, wherein said charge exchange means is a charge exchange cell.

4. A device according to claim 2, wherein said charge exchange means is a heat pipe.

5. A device according to claim 1, wherein said speed changing means includes means for generating a bias voltage for producing an electric field to which said charged particles are subjected to effect said speed changing.

6. A device according to claim 1, wherein said ionizing means is a laser photoionization device.

7. A device according to claim 1, wherein said cycling means includes a racetrack-shaped ion storage ring having semicircular path end sections and linear path side sections.

8. A device according to claim 3, wherein said charge exchange cell contains a charge exchange gas having a large cross-section for charge exchanging collisions with said charged particles.

9. A device according to claim 6, wherein said laser photoionization device is tunable to be in single or multiple photon resonance with energy levels of said particles.

10. A device according to claim 7, wherein said speed changing means, neutralizing means and ionizing means are disposed in one of said linear side sections.

11. A device according to claim 7, wherein magnetic field generating means are provided at each end section for generating a magnetic field in each end section for causing particles to travel in said semicircular path end sections.

12. A device according to claim 1, and further including a detector for collecting and measuring particles in an appropriate orbit in said cycling means.

13. A device according to claim 8, wherein said charge exchange gas is of the same species as said particles.

14. An isotope analysis device, comprising:
    speed changing means for speed changing isotope ions traveling along a first path to produce speed changed isotope particles;
    neutralizing means connected to said speed changing means for neutralizing selected speed changed isotope to produce selected speed changed neutral isotype particles;
    ionizing means connected to said neutralizing means for ionizing selected speed changed neutral isotope particles to produce selected isotope ions;
    cycling means connected to said ionizing means for cycling said selected isotope ions along a second path which is separated from said first path.

15. An isotope analysis device, comprising:
    a biased charge exchange cell for neutralizing selected isotope ions traveling along a first path to produce speed changed selected neutralized isotope particles;
    a laser photoionization device connected to said biased charge exchange cell for ionizing selected speed changed particles to produce selected isotope ions;
    a racetrack-shaped ion storage ring connected to said laser photoionization device for storing selected isotope ions for several orbits while un-ionized species are removed from said ion storage ring, to thereby enrich said selected isotope ions.

16. An isotope analysis device, comprising:
    an ion source means for producing isotope ions having a desired kinetic energy;
    cycling means connected to said ion source means for confining and cycling said isotope ions;
    transporting means for transporting said isotope ions from said ion source means into said cycling means;
    means for focusing and steering said isotope ions within said cycling means;
    speed changing means connected to said cycling means for changing the speed of said isotope ions in said cycling means;
    neutralizing means connected to said cycling means for neutralizing selected isotope ions after the speed of said isotope ions has been changed by said speed changing means;
    ionizing means connected to said speed changing means for ionizing selected neutralized isotope particles after they emerge from said neutralizing means;
    separating means connected to said cycling means for separating selected isotope ions into different orbits according to their mass and speed, said cycling means cycling said selected isotope ions through said neutralizing means and said ionizing means as many times as desired to achieve enrichment of said selected isotope ions; and means for detecting and/or collecting said selected isotope ions after a predetermined number of orbits through said speed changing means, said neutralizing means and said ionizing means.

17. An isotope entichment device, comprising:

an ion source means for producing isotope ions having a desired kinetic energy;

cycling means connected to said ion source means for confining and cycling said isotope ions;

transporting means for transporting said isotope ions from said ion source means into said cycling means;

means for focusing and steering said isotope ions within said cycling means;

speed changing means connected to said cycling means for changing the speed of said isotope ions in said cycling means;

neutralizing means connected to said cycling means for neutralizing selected isotope ions after the speed of said isotope ions has been changed by said speed changing means;

ionizing means connected to said speed changing means for ionizing selected neutralized isotope particles after they emerge from said neutralizing means;

separating means connected to said cycling means for separating selected isotope ions into different orbits according to their mass and speed, said cycling means cycling said selected isotope ions through said neutralizing means and said ionizing means as many times as desired to achieve enrichment of said selected isotope ions; and means for collecting isotopically enriched selected isotope ions after a predetermined number cf orbits through said speed changing means, said neutralizing means and said ionizing means.

18. A particle handling device, comprising:

a particle speed changing means for changing the speed of charged particles traveling along a path to produce speed changed charged particles;

neutralizing means connected to said speed changing means for neutralizing said speed changed charged particles to produce speed changed neutral particles; and ionizing means connected to said neutralizing means for ionizing speed changed neutral particles to produce speed changed charged particles.

19. A method of handling particles, comprising the steps of:

changing the speed of charged particles traveling along a first path to produce speed changed charged particles;

neutralizing said speed changed charged particles to produce speed changed neutral particles ionizing said speed changed neutral particles to produce speed changed charged particles; and cycling said speed changed charged particles along a second path which is separated from said first path.

20. A method for analyzing isotopes, comprising the steps of:

speed changing isotope ions traveling along a first path at a speed changing station to produce speed changed isotope particles;

neutralizing selected speed changed isotope particles at a neutralizing station to produce neutral speed changed isotope particles;

ionizing selected speed changed neutral isotope particles at an ionizing station to produce selected isotope ions; and cycling said selected isotope ions along a second path separated from said first path to remove unionized species and thereby enrich said selected isotope ions.

21. A method according to claim 20, wherein said speed changed isotope ions are neutralized by directing said ions through a charge exchange cell.

22. A method according to claim 20, wherein said ionizing step includes subjecting neutral isotope particles to laser photoionization.

23. A method according to claim 20, wherein said ionizing step includes subjecting neutral isotope particles to microwave ionization.

24. A method according to claim 20, wherein said ionizing step includes subjecting neutral isotope particles to microwave ionization and laser photoionization.

25. A method according to claim 20, wherein said selected isotope ions are cycled in orbits at least once through said speed changing, neutralizing and ionizing stations.

26. A method according to claim 25, wherein each orbit has a common path through said speed changing, neutralizing and ionizing stations, and a return path which is physically separated from a succeeding or preceding return path by a distance approximately proportional to kinetic energy differences of said selected isotope ions.

27. A method according to claim 26, wherein said selected isotope ions enter an orbit which is smaller than that prior to deceleration.

28. A method according to claim 26, wherein said selected isotope ions enter an orbit which is larger than that prior to acceleration.

29. A method according to claim 20, wherein said selected isotope ions are detected and measured, and non-ionized isotope ions are separately collected.

* * * * *